(12) United States Patent
Volz et al.

(10) Patent No.: US 12,001,227 B2
(45) Date of Patent: Jun. 4, 2024

(54) OPERATING METHOD FOR A VALVE SYSTEM, CONTROL UNIT AND COMPUTER PROGRAM PRODUCT

(71) Applicant: Siemens Aktiengesellschaft, Munich (DE)

(72) Inventors: Marco Volz, Karlsruhe (DE); Robert Markus Stegmanns, Ubstadt-Weiher (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/964,983

(22) Filed: Oct. 13, 2022

(65) Prior Publication Data

US 2023/0119500 A1    Apr. 20, 2023

(30) Foreign Application Priority Data

Oct. 14, 2021 (DE) .......................... 102021211592.6

(51) Int. Cl.
| | |
|---|---|
| G05D 16/02 | (2006.01) |
| G05B 15/02 | (2006.01) |
| G05D 16/00 | (2006.01) |
| G05D 16/20 | (2006.01) |

(52) U.S. Cl.
CPC ........... *G05D 16/028* (2019.01); *G05B 15/02* (2013.01); *G05D 16/2013* (2013.01)

(58) Field of Classification Search
CPC .......................... G05D 16/028; G05D 16/2013
See application file for complete search history.

(56) References Cited

U.S. PATENT DOCUMENTS

| | | | |
|---|---|---|---|
| 4,976,144 | A | 12/1990 | Fitzgerald |
| 5,080,136 | A | 1/1992 | Schiel et al. |
| 5,587,536 | A | 12/1996 | Rasmussen |

(Continued)

FOREIGN PATENT DOCUMENTS

| | | |
|---|---|---|
| DE | 3935812 | 5/1991 |
| DE | 102008053844 | 5/2010 |
| EP | 0637713 | 2/1995 |

OTHER PUBLICATIONS

Examination Report dated Sep. 8, 2022 based on DE102021211592.6 filed Oct. 14, 2021.

*Primary Examiner* — Paul J Gray
(74) *Attorney, Agent, or Firm* — Cozen O'Connor

(57) ABSTRACT

A valve system having a valve with a moveable armature and a pneumatic actuation apparatus, a controller, a computer program product for simulating operating behavior of the valve system and an operating method for the valve system, wherein the valve is provided in an active operating state and a valve position to be approached is specified, a target differential pressure corresponding to the valve position to be approached that is to be set in the pneumatic actuation apparatus is determined, a differential pressure in the pneumatic actuation apparatus is changed and the differential pressure present is detected, and the differential pressure present is stabilized if a deviation between the differential pressure present and the target differential pressure falls below a settable threshold value in terms of amount.

11 Claims, 3 Drawing Sheets

(56) References Cited

U.S. PATENT DOCUMENTS

| | | | |
|---|---|---|---|
| 8,375,842 B2* | 2/2013 | Kolbenschlag | F15B 11/08 91/361 |
| 2010/0132542 A1 | 6/2010 | Kolbenschlag et al. | |
| 2017/0286572 A1 | 10/2017 | Hershey et al. | |

* cited by examiner

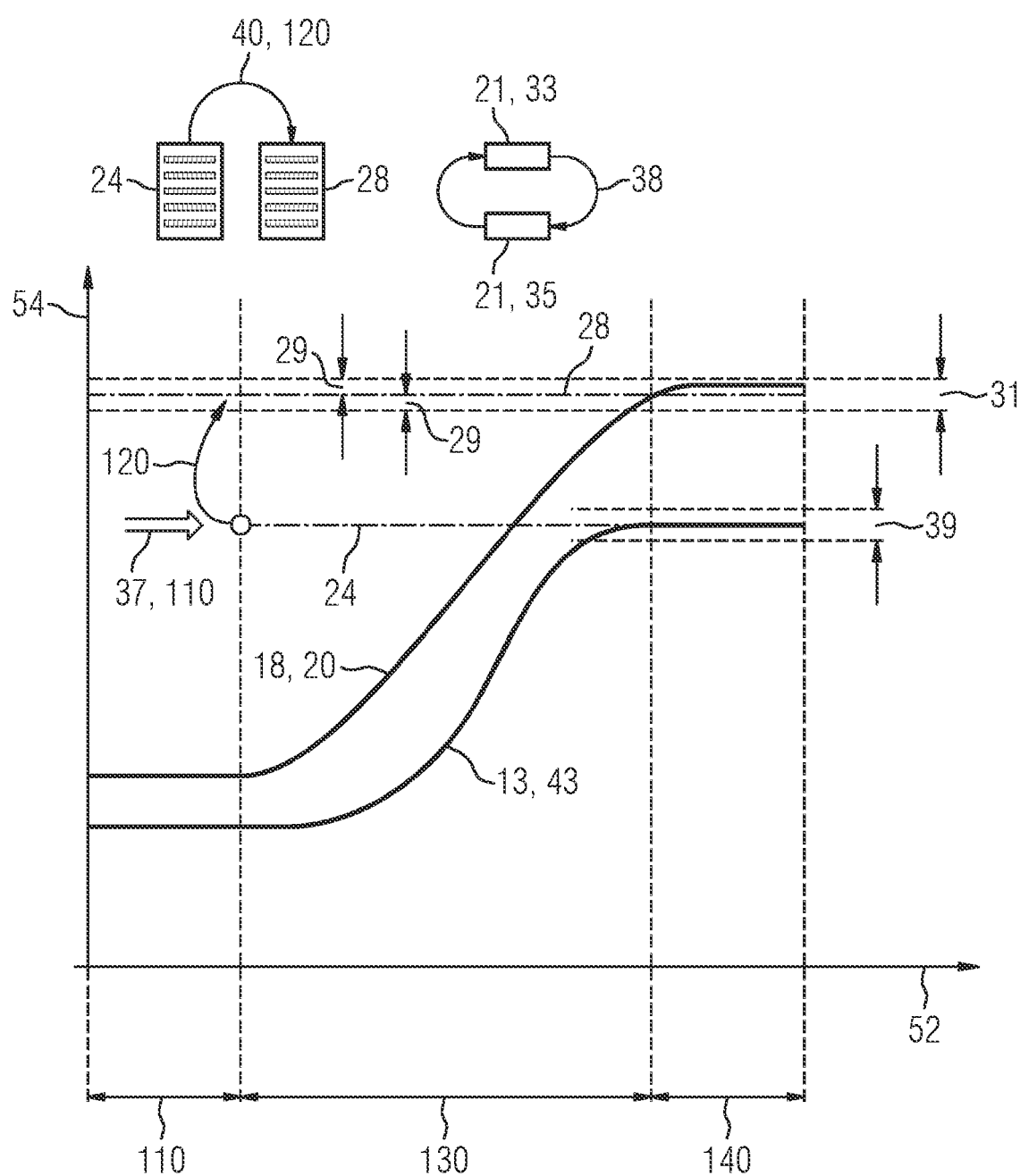

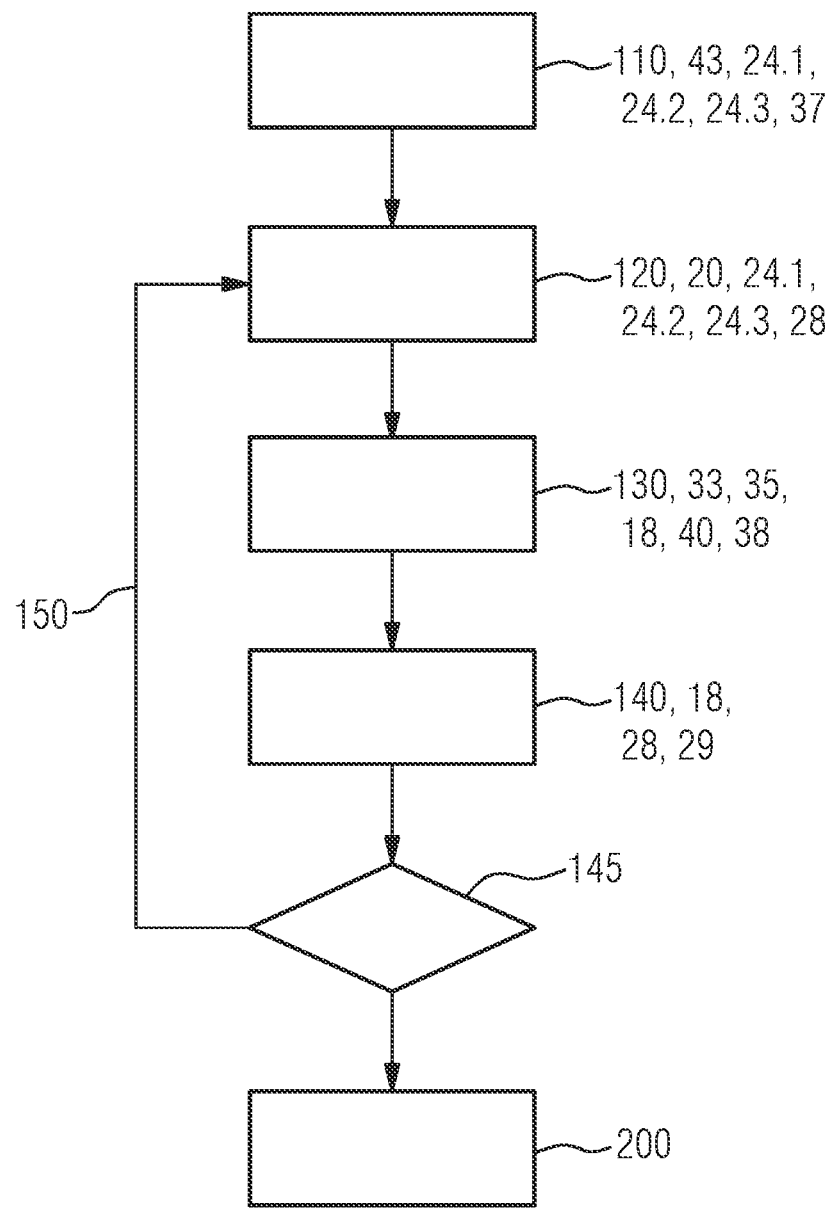

operating method for a valve system, control unit and computer program product

BACKGROUND OF THE INVENTION

1. Field of the Invention

The invention relates to an operating method for a valve in which a specifiable valve position is to be approached, a valve system configured to perform such an operating method, and to a computer program product for simulating the valve system.

2. Description of the Related Art

U.S. Pat. No. 5,587,536 discloses a valve system having a pneumatically actuated piston and a pressure sensor. The pressure sensor is configured to detect a pressure difference between different sides of the piston. From the course of the pressure difference, it is possible to identify whether the piston is set in motion on actuation or whether the piston has reached its end position after actuation.

U.S. Pat. No. 4,976,144 disclosed a valve that is provided with a position sensor. The position sensor makes known a position of a valve armature, which is moved by pressure in a pressure chamber with a diaphragm.

Valves are used in numerous applications in which a medium flow is to be controlled. Increasing requirements are being placed on the actuation accuracy of such valves in order to precisely set a flow. At the same time, valves are required to be compact and cost-efficient and to be easy to install, such as when retrofitting an existing system. In addition, increasing reliability is sought.

SUMMARY OF THE INVENTION

It is an object of the invention to provide a solution that offers improvement in at least one of the aspects outlined.

This and other objects and advantages are achieved in accordance with the invention by an operating method for a valve system that comprises a valve that can be actuated by a pneumatic actuation apparatus. In accordance with the invention, the valve comprises an armature that is movable via the pneumatic actuation apparatus. For this purpose, the pneumatic actuation apparatus can be detachably connected to the armature. The armature is movable between two end positions, where a first end position corresponds to an open position and a second end position corresponds to a closed position. The operating method comprises a first step in which the valve is provided in an active operating state. Herein, the valve is attached to a fluid line with a through-flowing medium. Likewise, the pneumatic actuation apparatus is coupled to the armature of the valve in the active operating state. In addition, the valve position to be approached is specified in the first step. This can, for example, be performed by a user, an algorithm or a higher-level control unit. This is followed by a second step in which a target differential pressure corresponding to the valve position to be approached is determined. Between the end positions, there is a substantially monotonic relationship between the valve position to be approached and the corresponding target differential pressure. The target differential pressure determined is to be set in the pneumatic actuation apparatus and the specified valve position is to be achieved.

The foregoing is followed by a third step in which the differential pressure present in the pneumatic actuation apparatus is changed to achieve the target differential pressure. In addition, the differential pressure present is detected in the third step to identify the achievement of the valve position to be approached. The operating method also comprises a fourth step in which the differential pressure present is stabilized. For this purpose, it is, for example, possible for closed loop control of the pneumatic actuation apparatus to be set and the differential pressure present to be kept substantially static. Here, the differential pressure present is stabilized when a deviation between the differential pressure present and the target differential pressure falls below a settable threshold value in terms of amount. The differential pressure stabilized in the fourth step corresponds to the valve position to be approached.

In the operating method in accordance with the invention, the valve position to be approached is substantially achieved by a feedback loop in which the differential pressure present is compared with a target differential pressure. This defines a particularly simple circuit in the sense of the open-loop and closed-loop theory that can also be run with increased precision via simple regulators. A circuit of this kind is also robust against disruptive influences and requires reduced computing power. Accordingly, the operating method in accordance with the invention offers an increased degree of actuation accuracy and can be implemented with simple hardware. There is no need to include further input variables in order to approach the specified valve position. This makes it possible to dispense with additional sensors and the associated installation space. As a result, the operating method in accordance with the invention allows a valve system to which it is applied to be formed in a particularly cost-efficient and compact manner. This, in turn, enables the installation of a valve system operated via the operating method in accordance with the invention, such as in an automation system, even in locations with reduced installation space.

In one embodiment of the operating method, at least the second, third and fourth step are performed without mechanical, electromechanical, magnetic, capacitive or optical detection of the present valve position. This comprises any direct detection of the present valve position from a location or movement of the armature itself, such as via a displacement transducer. The setting of the specified valve position can in particular be based exclusively on detected pressures, such as a first and/or second chamber pressure in the pneumatic actuation apparatus, in combination with the target differential pressure determined in the second step. The invention is inter alia based on the surprising discovery that a differential pressure in the pneumatic actuation apparatus, which can, for example, be determined from the first and second chamber pressure, represents a sufficiently precise variable for accurately approaching a specified valve position. In particular, there is no need for additional structures for mechanical displacement transducers on the armature, which have considerable dimensions in the radial direction relative to the fluid line. The inventive operating method allows the use of valve systems with a reduced number of components and this, in turn, offers an increased degree of robustness. In addition, compared to conventional solutions, a connection between the armature and the pneumatic actuation apparatus requires a reduced degree of assembly accuracy. This, in turn, allows simple construction of the pneumatic actuation apparatus and the armature. In particular, this increases the degree of design freedom for the valve system.

In addition, in the inventive operating method, the valve position to be approached can lie between the two end positions of the armature, which substantially correspond to an open position and a closed position. A valve control to be approached lying between the end positions allows throughflow of the medium in the fluid line to be regulated continuously. When, for example, using a corresponding valve system in an automation system, the inventive operating method enables a precisely regulated operation in which the medium is to be dispensed. In a surprisingly precise manner, the inventive operating method allows not only end positions of the armature, i.e., of the valve system, to be approached, but also any intermediate position. This extends the range of possible applications of a corresponding valve system.

The differential pressure can be formed based on the first and/or second chamber pressure present in the pneumatic actuation apparatus. The first and/or second chamber pressure each represent the pressures in two regions of the pneumatic actuation apparatus separated by a diaphragm and via which a movement of the armature can be brought about. A pneumatic actuation apparatus that can only be actuated via the first or second chamber pressure is a "single-acting" pneumatic actuation apparatus. Here, the differential pressure present results from the difference between the first or second chamber pressure and, for example, a spring force. When the first and second chamber pressure are used, the apparatus is a "double-acting" pneumatic actuation apparatus. Herein, the differential pressure results from the difference between the first and second chamber pressure. In a further embodiment of the inventive operating method, the first and/or second chamber pressure are detected at a first or second pressure line of the valve. The first chamber pressure is provided via the first pressure line and the second chamber pressure is provided via the second pressure line. Consequently, a suitable pressure sensor can substantially be attached at any point of the first or second pressure line. In particular, the first and/or second chamber pressure can be detected spatially separated from the valve. Such spatial separation enables a valve system configured to execute the operating method in accordance with the disclosed embodiments to also be used in potentially explosive atmospheres. Components, such as pressure sensors or also a control unit that can cause electrical discharges, can be positioned separately from the pneumatic actuation apparatus. Consequently, the detection of the first and second chamber pressure at the first or second pressure line serves to increase explosion protection. As a result, there is no need for installation space for at least one pressure sensor on the valve system; this enables further miniaturization of the valve system. In addition, compared to conventional solutions, the outlay for connections can be reduced, in particular the amount of "pressure piping" on the valve system. Furthermore, a pressure sensor for detecting the first or second chamber pressure can be attached at an easily accessible position, thus allowing quicker maintenance of the valve system.

Furthermore, the first and/or second chamber pressure can be determined via a pressure sensor with a measuring accuracy of up to +/−1.0%, in particular up to +/−0.5%, preferably up to +/−0.1%, particularly preferably up to 0.01%. As a result, the differential pressure can be detected with a measuring accuracy of up to +/−10 mbar, in particular up to +/−5 mbar, preferably up to +/−1 mbar, particularly preferably up to 0.1 mbar. Pressure sensors with such measuring accuracy are easily and inexpensively available. The disclosed embodiments of the invention are inter alia based on the surprising discovery that even pressure sensors with such measuring accuracy enable a specified valve position to be approached precisely. For example, surprisingly, sufficient accuracy can be achieved in the claimed operating method even with a pressure sensor that offers only +/−10 mbar measuring accuracy for the differential pressure. With a measuring accuracy of up to +/−0.1 mbar, a saturation effect occurs in which the gain in actuation accuracy stagnates due to improved measuring accuracy. In addition, the pressure sensor for the first and/or second chamber pressure can be embodied as a self-calibrating pressure sensor. Consequently, the pressure sensor can be automatically recalibrated during operation of the valve system. This enables compensation of a "sensor drift" during operation. As a result, the operating method in accordance with the disclosed embodiments can be performed permanently with increased precision based on simple pressure sensors.

In a further embodiment of the operating method, the threshold value, which, when fallen below in terms of amount, causes the fourth step to be performed, corresponds to 0.1% to 3.0% of a stroke length of the armature of the valve. Here, the stroke length should be understood to be the distance between the end positions of the armature. Consequently, the threshold value specifies an achievable actuation accuracy in the disclosed embodiments of the operating method. The actuation accuracy, in turn, determines the accuracy with which a throughflow of medium through the fluid line can be set. The disclosed embodiments of the operating method with the detection of the differential pressure for setting a valve control to be approached is based on an indirect operating principle. In particular, in connection with the outlined pressure sensors, advantageously increased actuation accuracy is achieved with a reduced number of components and reduced space requirement.

In addition, in the second step, the target differential pressure corresponding to the valve position to be approached can be determined taking account of hysteresis. Here, in particular, it is possible for path dependency to be taken into account on actuation of the armature, for example, an actuation direction of the armature. Such hysteresis can be stored in a control unit of a valve system. Likewise, hysteresis in the disclosed embodiments of the operating method can be determined by automatic calibration. Taking account of hysteresis enables the achievable actuation accuracy to be further increased.

Furthermore, in the disclosed embodiments of the operating method, at least the second and third step can be performed repeatedly in order to travel through a specifiable traversing profile of the armature. The traversing profile comprises a plurality of valve settings and can be specified by a user and/or an algorithm. In particular, the traversing profile to be traveled through can be specified in the first step. The disclosed embodiments of the operating method can also be performed quickly with reduced computing power so that even repeated performance of the second and third step is possible with reduced additional outlay. The fact that the pneumatic actuation apparatus has a certain elasticity due to the compressibility of the compressed air used means the disclosed embodiments of the operating method are suitable for approaching a plurality of valve settings in a concatenated manner. This avoids discontinuous transitions when traveling through the plurality of valve settings to be approached. This allows targeted actuation of the valve system, for example continuous delayed opening of the valve. As a result, the disclosed embodiments of the operating method have a broad range of possible applications.

In a further embodiment of the operating method, at least one of the steps, i.e., the first, second, third or fourth step, is performed while taking into account an assembly orientation of the valve system, inertial forces on moveable components of the valve system and/or frictional forces present in the valve system. The assembly orientation results in a force component along an actuation direction of the valve resulting from the armature's own weight. Accordingly, the assembly orientation influences the actuation behavior of the valve system in the claimed operating method. The assembly orientation can be specified by a user and/or an algorithm at the control unit of the valve system. Furthermore, inertial forces resulting, for example, from the mass and speed of the moveable components can be calculated in a simple manner. In particular, this enables "overshooting" to be avoided upon actuation of the pneumatic actuation apparatus. This applies equally to the friction forces acting on the moveable components, which are speed-dependent. Alternatively or supplementarily, the assembly orientation, the inertial forces and/or the friction forces can be taken into account by corresponding calibration of the valve system. The more accurate the assembly orientation, the inertial forces of moveable components and/or the friction forces of the valve system, in particular the armature, are known, the more accurately the armature can be positioned along the actuation direction.

In addition, the disclosed embodiments of the operating method can comprise self-calibration that can be performed before the first step. The self-calibration comprises approaching the two end positions of the valve system, where a pressure-time characteristic is recorded. Upon achieving an end position, the pneumatic actuation apparatus can be substantially fully vented or ventilated. In particular, this enables a first derivative of the pressure-time characteristic to be determined on the basis of which the achievement of the end positions is identifiable. The pressure-time characteristic enables the specified differential pressure to be approached with increased precision. Furthermore, the self-calibration can be performed automatically during continuous operation of the operating method and thus compensate drifting of the valve system, in particular the pneumatic actuation apparatus. Such drifting can, for example, occur due to abrasion of the valve seat. This enables detection of wear of the valve system.

It is also an object of the invention to provide a valve system comprising a valve and a pneumatic actuation apparatus. The pneumatic actuation apparatus is configured such that a differential pressure can be specified at this system via which an armature of the valve can be moved. For this purpose, the pneumatic actuation apparatus can be detachably connected to the armature of the valve. The valve system can be mounted on a fluid line through which a medium, such as gas, steam, liquid, a suspension, a mixture thereof, or a viscous substance, for example, a paste, can flow. The fluid line defines an axial direction along the fluid line and, relative thereto, a radial direction. In accordance with the invention, a specifiable valve position can be set solely via the differential pressure as an input variable, for example, in a regulating circuit. The specified valve position is to be approached during operation of the valve system. Approaching the specified valve position solely via the differential pressure as an input variable means there is no need for additional means for detecting a valve position of the armature, such as mechanical, electromechanical or optical displacement transducers. Accordingly, installation space between the valve and the pneumatic actuation apparatus can be reduced. Therefore, the sole use of the differential pressure for setting, i.e., approaching, the specified valve position serves to save installation space in the radial direction.

Consequently, the valve system in accordance with the invention can be formed in a particularly compact manner, which, in turn, allows the valve system to be installed in existing automation systems where space is limited. Saving on additional displacement transducers reduces the number of components and achieves increased cost efficiency. At the same time, the valve system in accordance with the invention offers an increased degree of actuation accuracy. Likewise, the valve system in accordance with the invention has a simplified structure in which attaching structure such as holes and ribs are minimized. In particular, the armature has a simple and cost-efficient structure. In addition, the valve system in accordance with the invention can be configured to perform at least one of the above-outlined operating methods in accordance with the disclosed embodiments.

In one embodiment of the inventive valve system, a first and/or second chamber pressure in the pneumatic actuation apparatus can each be set via a pressure line. The first and second chamber pressure result in the differential pressure via which the pneumatic actuation apparatus moves the armature. The pressure present in the respective pressure line corresponds to the first or second chamber pressure. The pressure lines can each be provided with a pressure sensor via which the first or second chamber pressure can be detected at substantially any position on the corresponding pressure line. Consequently, the pressure sensors can be attached at easily accessible positions on the pressure line. There is no need for additional installation space for the pressure sensors on the valve system itself. Additionally, providing the first or second chamber pressure via one pressure line each reduces the amount of piping required on the valve system itself. Furthermore, the first or second chamber pressure can be reliably and accurately set via pressure lines, such as with compressed air. This makes the valve system in accordance with the disclosed embodiments of the invention robust and reliable. Alternatively or supplementarily, at least one pressure sensor can be arranged on or in the pneumatic actuation apparatus.

In addition, the claimed valve system can have a control unit or controller that is configured to control the valve system. The control unit or controller is configured to detect the differential pressure present in the pneumatic actuation apparatus and compare the detected differential pressure with the specified target differential pressure. Likewise, the control unit or controller is configured to change the differential pressure. The control unit or controller is suitable for receiving, from a user and/or an algorithm, such as from a higher-level control unit or controller, a valve position to be approached and/or a threshold value to be taken into account when comparing the differential pressure present with the target differential pressure. In accordance with disclosed embodiments of the invention, the control unit is configured to perform at least one of the above-outlined operating methods in accordance with the disclosed embodiments. For this purpose, the control unit or controller can have a computer program product stored executably on the control unit or controller.

It is also an object of the invention to provide a control unit or controller. Here, the control unit or controller is configured to actuate an armature in a valve system. The valve system can be mounted on a fluid line in order to regulate the throughflow of a medium through the fluid line. The armature is coupled to a pneumatic actuation apparatus that is also part of the valve system. The control unit or controller is configured to receive measurement signals for a first and/or second chamber pressure present in the pneumatic actuation apparatus. Similarly, the control unit or controller is configured to output control signals for setting the first and/or second chamber pressure. Overall, this enables a differential pressure in the pneumatic actuation apparatus to be detected and changed. IN accordance with the invention, the control unit is configured to perform at least one embodiment the disclosed embodiments of the operating method. To this end, the control unit or controller can be equipped with a corresponding computer program product. The control unit or controller can be formed as a local control unit or controller connected to the valve system or as a higher-level control unit that is connected to the valve system via a communicative data connection, such as a network connection, Internet connection or mobile radio connection. The higher-level control unit can, for example, be configured as a master computer, webserver or computer cloud. In particular, the higher-level control unit or controller can be configured to control an automation system. As a further alternative, the control unit or controller can also be formed as a combination of a local control unit and a higher-level control unit.

It is a further object of the invention to provide a computer program product, which is configured to simulate the operating behavior of a valve system that can be connected to a fluid line. In particular, the computer program product can be configured to simulate the operational behavior of the valve system in that the structure of the valve system is permanently specified therein. In accordance with the invention, the valve system that can be simulated via the computer program product is configured in accordance with to at least one embodiment of above-disclosed embodiments. To this end, an image of the valve system can be stored in the computer program product. Alternatively or supplementarily, the mode of operation of the valve system can be stored in the form of a computer model. The computer program product has a physical module with which the behavior of the valve system in response to variable operating conditions can be simulated. The variable operating conditions include, for example, the density of the medium in the fluid line, the temperature thereof, the flow rate thereof and/or the viscosity thereof. Likewise, a variable first and/or second chamber pressure can be included in a pneumatic actuation apparatus through which an armature of the valve system can be moved. Furthermore, the throughflow of the medium in the fluid line is included in the operating behavior which is dependent on the present valve position of the valve system, i.e., the armature thereof. To this end, the computer program product can a have a suitable data interface via which the corresponding data can be specified via a user input and/or other simulation-oriented computer program products. The computer program product can also have a data interface for outputting simulation results to a user and/or other simulation-oriented computer program products. The computer program product in accordance with the disclosed embodiments of the invention can, for example, be used to check the plausibility of measurement signals sent from a pressure sensor to a control unit. This, for example, enables a defective pressure sensor to be identified. The computer program product can be formed as a "digital twin" as described, for example, in more detail in U.S. Pub. No. 2017/286572 A1, the content of which is incorporated by reference herein in its entirety. The computer program product can be formed as monolithic, i.e., fully executable on a hardware platform. Alternatively, the computer program product can be formed as modular and can comprise a plurality of subprograms that can be executed on separate hardware platforms and interact via a communicative data connection. Furthermore, the computer program product can be part of an automation system controller. Moreover, the computer program product according to the invention can be used to test valve systems and/or operating methods to be executed thereon.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is described in more detail below in figures with reference to an embodiment. The figures are be read as mutually complementary in that the same reference symbols in different figures have the same technical meaning, where the features of the embodiments can be combined with the features outlined above, in which:

FIG. 2 a diagram of a first embodiment of the operating method in accordance with the invention; and FIG. 3 a flow chart of a second embodiment of the claimed operating method.

DETAILED DESCRIPTION OF THE EXEMPLARY EMBODIMENTS

Figure 1:
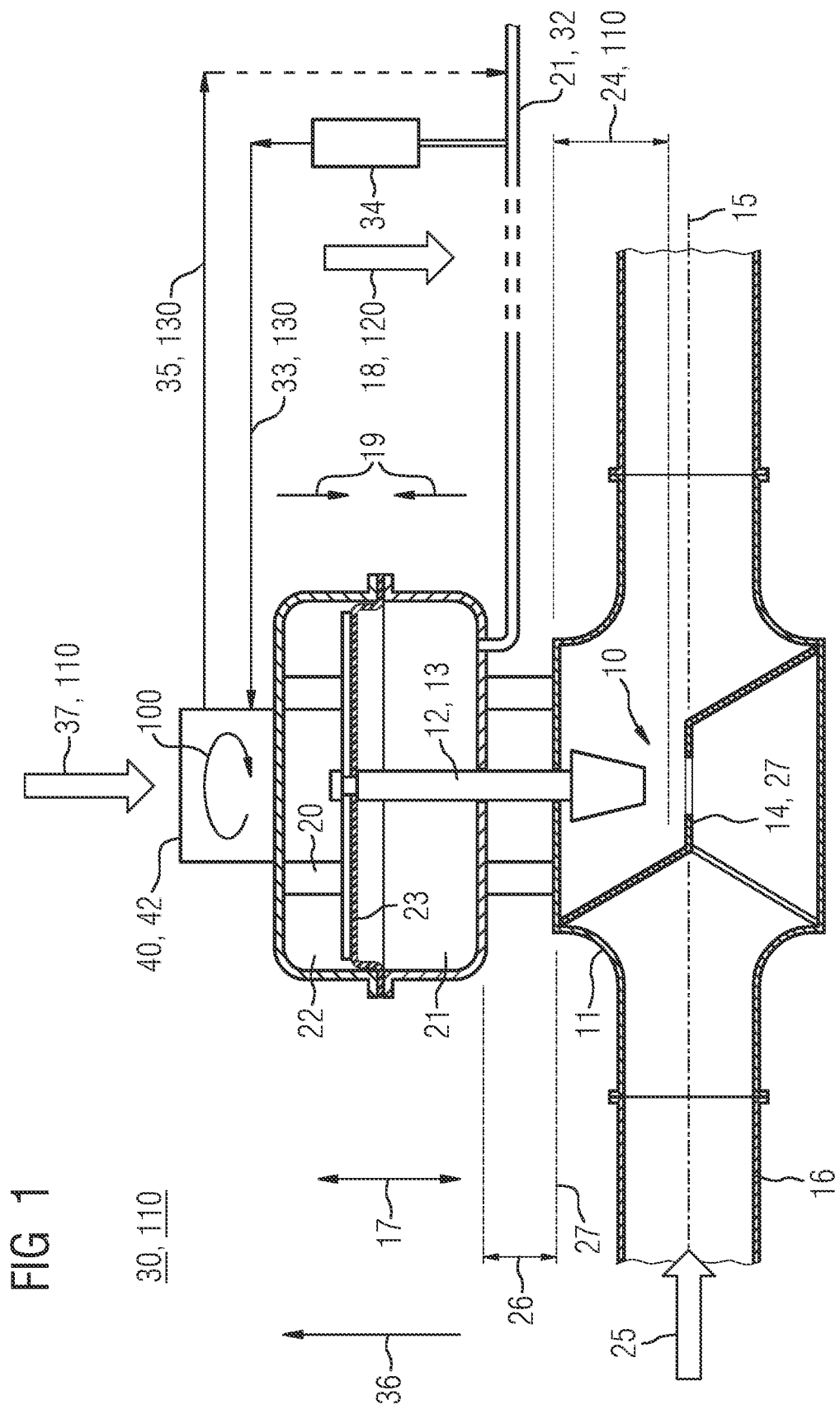
FIG. 1 a schematic view of a structure of a first embodiment of the valve system in accordance with the invention.

FIG. 1 is a schematic view of the structure of a first embodiment of the inventive valve system 30. The valve system 30 comprises a valve 10 that has an armature 12 that can be moved along an actuation direction 17 via a pneumatic actuation apparatus 20. The armature 12 can be moved between two end positions 27 that are defined by a stop of the armature 12 on a valve housing 11 and a valve seat 14. The valve 10 is connected to a fluid line 16 through which a pipe axis 15 is defined. The valve 10 is configured to regulate a throughflow of a medium 25 through the pipe 16 in dependence on a present valve position 13, i.e., a position of the armature 12 along the actuation direction 17. The pneumatic actuation apparatus 20 comprises a diaphragm 23 via which the regions with a first or a second chamber pressure 21, 22 are separated. The first chamber pressure 21 is provided via a pressure line 32. The first chamber pressure 21 causes deformation of the diaphragm 23 so that the armature 12 can be moved along the actuation direction 17. Furthermore, the first chamber pressure 21 on the pressure line 32 can be detected by a pressure sensor 34 that can be positioned at substantially any position along the pressure line 32. The pressure sensor 34 has a measuring accuracy of up to +/−10 mbar. This is symbolized in FIG. 1 by the partially interrupted pressure line 32. The first chamber pressure 21 detected by the pressure sensor 34 is sent in the form of measurement signals 33 to a control unit 40 (controller) assigned to the valve system 30, in particular the pneumatic actuation apparatus 20. The control unit 40 (controller) is suitable for receiving and processing the measurement signals 33. Likewise, the control unit 40 is suitable for setting the first chamber pressure 21 via a control signal 35.

The first and second chamber pressures 21, 22 result in differential pressure 18 acting on the diaphragm 23 in the actuation direction 17 via which the armature 12 of the valve 10 can be positioned. In particular, the first and second chamber pressures 21, 22 result in pressure forces 19. The valve system 30 has a radial distance 26 between the valve 10 and the pneumatic actuation apparatus 20. Herein, the term radial distance 26 should be understood in the sense of a radial direction 36 that is defined with respect to the pipe axis 15. The radial distance 26 between the valve 10 and the actuation direction 20 is minimized. In particular, the radial distance 26 is dimensioned such that no displacement transducer can be attached between the valve 10 and the pneumatic actuation apparatus 20. The valve system 30 is formed without a mechanical, electromechanical or optical displacement transducer. As a result, the valve system 30 is more compact in the radial direction 36.

The valve system 30 is suitable for operation in accordance with an operating method 100 that can be implemented via the control unit 40. The control unit 40 is formed as a local control unit 42 that is directly connected to the valve system 30. In a first step 110, the operating method 100 starts with an active operating state of the valve system 30 in which it is installed and operational. In the first step 110, a valve position 24 to be approached is specified via a user input 37. A second step 120 in which a target differential pressure 28 corresponding to the valve position 24 to be approached is determined is performed via the control unit 40. This occurs via a value table, an algorithm, artificial intelligence and/or a formula stored in the control unit 40.

Likewise, the control unit 40 (controller) performs a third step 130 in which the differential pressure 18 present in the pneumatic actuation apparatus 20 is detected. To this end, the pressure sensor 34 receives measurement signals 33 reflecting the first chamber pressure 21. Similarly, in the third step 130, the first chamber pressure 21 is set in order to adapt the differential pressure 18 present to the target differential pressure 28. For this purpose, the control unit 40 outputs control signals 35 that act on the supply of compressed air in the pressure line 35. Here, an actuation direction of the armature 12, in particular hysteresis stored in the control unit 40, is taken into account. The movement of the armature 12 sets a traversing profile 43 for the valve 10, and thus also for the valve system 30.

In addition, the operating method 100 comprises a fourth step 140 in which the differential pressure 18 present is compared with the target differential pressure 28 by determining a deviation between them. If the deviation between the target differential pressure 28 and the differential pressure 18 present falls below a settable threshold value 29, then the differential pressure 18 present is stabilized. The target differential pressure 28 corresponds to the valve position 24 to be approached. Accordingly, the armature 12 reaches the valve position to be approached 24 in the fourth step 140. As a result, the armature 12, and thus the valve 10 and the valve system 30 achieve increased actuation accuracy. The structure of the valve system 30 in FIG. 1 is mapped in a computer program product 60 configured to simulate the operating behavior of the valve system 30. For this purpose, the computer program product 60 is formed as a digital twin.

A first embodiment of the inventive operating method 100 is depicted in a diagram 50 in FIG. 2. The aspects of the operating method 100 depicted in FIG. 2 can be transferred to the operating method 100 shown in FIG. 1. The diagram 50 has a horizontal time axis 52 and a vertical size axis 54. The operating method 100 starts with an active operating state in the first step 110 in which a valve system 30 suitable for executing the outlined operating method 100 is mounted in an operative manner. Meanwhile, a differential pressure 18 present in a pneumatic actuation apparatus 20 of the valve system 30 is substantially constant. The first step 110 ends with a user input 37 by means of which a valve position 24 to be approached is specified.

In a second step 120, a control unit 40 determines a target differential pressure 28 corresponding to the valve position 24 to be approached. For this purpose, the control unit 40 has a value table symbolized in FIG. 2. This is followed by a third step 130 in which the differential pressure 18 present in the pneumatic actuation apparatus 20 (not shown in further detail) is increased. For this purpose, a first chamber pressure 21 that is also present in the pneumatic actuation apparatus 20 is determined. The increase in the first chamber pressure 21 causes a present valve position 13 of the armature 12 (as indicated in FIG. 1) to change. The measurement signals 33 are evaluated in a regulating circuit 38 and corresponding control signals 35 are generated in order to adapt the differential pressure 18 present.

At the end of the third step 130, the differential pressure 18 present approaches the target differential pressure 28. The target differential pressure 28 has a tolerance margin 31 that is substantially determined by two threshold values 29 that are above or below the target differential pressure 28 respectively. The fact that the tolerance margin has been reached is identified when a deviation between the differential pressure 18 present and the target differential pressure 28 has fallen below one of the threshold values 29 in terms of amount. The threshold values 29 can, for example, be set by a user. Furthermore, the tolerance margin 31 defines an actuation accuracy 39 that can be achieved with the valve system 30, i.e., an achievable positional accuracy of the armature 12 after approaching a specified valve position 24. The outlined identification of the tolerance margin 31 from the differential pressure 18 occurs in a fourth step 140.

In the fourth step 140, the differential pressure 18 present is also stabilized so that the present valve position 13 is also stabilized in the region of the specified valve position 24. The mode of operation of the described operating method 100 in a valve system 30, as, for example, shown in FIG. 1, can be simulated by a computer program product. The computer program product 60 has interfaces for inputting and outputting data reflecting the mode of operation outlined in FIG. 2. Furthermore, the computer program product 60 is formed as a digital twin.

The sequence of a second embodiment of the inventive operating method 100 is depicted schematically in FIG. 3. Here, the operating method 100 starts from a first step 110 in which a valve system 30, such as depicted in FIG. 1, is provided in an active operating state. A user input 37 occurs via which a traversing profile 43 to be traveled through is specified. The traversing profile 43 comprises a first, second and third valve position 24.1, 24.2, 24.3 to be approached that are linked to one another. This is followed by a second step 120 in which a target differential pressure 28 corresponding to the first valve position 24.1 to be approached for a pneumatic actuation apparatus 20 (not shown) of the valve system 30 is determined. This is followed by a third step 130 in which the differential pressure 18 is determined via measurement signals 33 and compared with the target differential pressure 28. In the third step 130, control signals 35 are used to adapt the differential pressure 18 present. This occurs via a regulating circuit 38 in a control unit 40 of the valve system 30.

The foregoing is followed by a fourth step 140 in which the differential pressure 18 present is compared with the target differential pressure 28. If the deviation between the differential pressure 18 present and the target differential pressure 28 falls below a settable threshold value 29 at least in terms of an amount, then the differential pressure 18 is stabilized. This is followed by a first branch 145 in which a check is made to determine whether the last of the valve positions 24.1, 24.2, 24.3 to be approached has already been reached. If at least one valve position 24.1, 24.2, 24.3 to be approached has not yet been reached, then the method 150 returns to the second step 120. The second, third and fourth step 120, 130, 140 are then repeated for the subsequent valve position 24.2, 24.3 to be approached. Otherwise, the first branch 145 leads to an end state 200 in which the operating method 100 ends. The operating behavior of the associated valve system 30 can be simulated in a computer program product 60 formed as a digital twin.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An operating method for a valve system having a valve with a moveable armature and a pneumatic actuation apparatus, the method comprising:
   a) providing, by a controller, the valve in an active operating state and specifying a valve position to be approached;
   b) determining, by the controller, a target differential pressure corresponding to the valve position to be approached which is to be set in the pneumatic actuation apparatus;
   c) changing, by the controller, a differential pressure present in the pneumatic actuation apparatus and detecting the differential pressure present; and
   d) stabilizing, by the controller, the differential pressure present when a deviation between the differential pressure present and the target differential pressure falls below a settable threshold value in terms of amount;
   wherein the valve position to be approached lies between two end positions of the moveable armature; and
   wherein the operating method comprises self-calibration of the valve system in which the end positions are approached to determine a pressure-time characteristic.

2. The operating method as claimed in claim 1, wherein steps b) to d) are performed without mechanical, electromechanical, magnetic, capacitive or optical detection of a present valve position.

3. The operating method as claimed in claim 1, wherein the differential pressure is formed based on at least one of a first and second chamber pressure; and wherein the at least one of the first and second chamber pressure is detected at a first or second pressure line of the valve.

4. The operating method as claimed in claim 3, wherein at least one of the first and second chamber pressure is determined via a pressure sensor with a measuring accuracy of up to +/−10 mbar.

5. The operating method as claimed in claim 1, wherein the settable threshold value corresponds to up to 0.1% to 3.0% of a stroke length of the pneumatic actuation apparatus.

6. The operating method as claimed in claim 1, wherein a corresponding target differential pressure is determined during step (b) while taking into account hysteresis.

7. The operating method as claimed in claim 1, wherein at least steps b) and c) are performed repeatedly in order to travel through a specifiable traversing profile of the armature.

8. The operating method as claimed in claim 1, wherein at least one of steps a) to d) is performed while taking into account an assembly orientation of the valve system.

9. A valve system comprising: a valve; a pneumatic actuation apparatus in which setting a differential pressure causes an armature of the valve to be moveable, a specifiable valve position being settable in a radial direction via the differential pressure as a sole input variable to save installation space of the valve system; and a controller; wherein the controller is configured to: a) provide the valve in an active operating state and specify a valve position to be approached; b) determine a target differential pressure corresponding to the valve position to be approached which is to be set in the pneumatic actuation apparatus; c) change a differential pressure present in the pneumatic actuation apparatus and detect the differential pressure present; and d) stabilize the differential pressure present when a deviation between the differential pressure present and the target differential pressure falls below a settable threshold value in terms of amount; wherein the valve position to be approached lies between two end positions of the moveable armature; and wherein the controller is further configured to initiate a self-calibration of the valve system such that the end positions are approached to determine a pressure-time characteristic.

10. The valve system as claimed in claim 9, wherein a first and/or second chamber pressure are each settable via a pressure line.

11. A controller for actuating a moveable armature on a pneumatic actuation apparatus for a valve system, the controller being configured to receive measurement signals for a first and a second chamber pressure and to output control signals for setting at least one of the first and second chamber pressures, and wherein the controller is further configured to: a) provide a valve in an active operating state and specify a valve position to be approached; b) determine a target differential pressure corresponding to the valve position to be approached which is to be set in the pneumatic actuation apparatus; c) change a differential pressure present in the pneumatic actuation apparatus and detect the differential pressure present; and d) stabilize the differential pressure present when a deviation between the differential pressure present and the target differential pressure falls below a settable threshold value in terms of amount; wherein the valve position to be approached lies between two end positions of the moveable armature; and wherein the controller is configured to initiate a self-calibration of the valve system such that the end positions are approached to determine a pressure-time characteristic.

* * * * *